US012728896B2

(12) United States Patent
Ito et al.

(10) Patent No.: US 12,728,896 B2
(45) Date of Patent: Sep. 8, 2026

(54) VEHICLE CONTROL DEVICE AND VEHICLE CONTROL SYSTEM

(71) Applicant: Hitachi Astemo, Ltd., Hitachinaka (JP)

(72) Inventors: Takeshi Ito, Tokyo (JP); Yuki Horita, Tokyo (JP); Masashi Seimiya, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 71 days.

(21) Appl. No.: 18/843,008

(22) PCT Filed: Mar. 30, 2023

(86) PCT No.: PCT/JP2023/013190

§ 371 (c)(1),
(2) Date: Aug. 30, 2024

(87) PCT Pub. No.: WO2023/243183

PCT Pub. Date: Dec. 21, 2023

(65) Prior Publication Data

US 2025/0178638 A1 Jun. 5, 2025

(30) Foreign Application Priority Data

Jun. 15, 2022 (JP) ................................ 2022-096451

(51) Int. Cl.
*B60W 60/00* (2020.01)

(52) U.S. Cl.
CPC ... *B60W 60/0015* (2020.02); *B60W 2420/403* (2013.01)

(58) Field of Classification Search
CPC ....... B60W 60/0015; B60W 2420/403; B60W 2555/20
See application file for complete search history.

(56) References Cited

U.S. PATENT DOCUMENTS 8,229,663 B2 * 7/2012 Zeng ..................... G01S 13/726 340/995.25
9,147,353 B1 * 9/2015 Slusar ................... B60W 40/09
(Continued)

FOREIGN PATENT DOCUMENTS

AU 2015262344 A1 * 12/2016 ............. G06T 7/285
CN 110626269 A * 12/2019 ............. B60R 16/02
(Continued)

OTHER PUBLICATIONS

International Search Report (PCT/ISA/210) issued in PCT Application No. PCT/JP2023/013190 dated Jun. 20, 2023 with English translation (5 pages).

(Continued)

*Primary Examiner* — Redhwan K Mawari
(74) *Attorney, Agent, or Firm* — Crowell & Moring LLP

(57) ABSTRACT

An object of the invention is to improve the availability while ensuring safety relating to a vehicle control system that performs driving assistance and automated driving in a backlight environment. The vehicle control device configured to be mounted on a vehicle according to the invention includes a sun position calculation unit configured to calculate position information of the sun at a predetermined time, a visually-unrecognizable region calculation unit configured to calculate a visually-unrecognizable region in which it is difficult to visually recognize a visual recognition target object based on the position information of the sun and position information of the visual recognition target object, and a visually-unrecognizable region output unit configured to output the calculated visually-unrecognizable region. The vehicle control device further includes a visually-unrecognizable region acquisition unit configured to acquire information on the visually-unrecognizable region, and a vehicle control information output unit configured to specify the visually-unrecognizable region on a path of the (Continued)

vehicle based on the acquired information on the visually-unrecognizable region and output control information of the vehicle based on the specified visually-unrecognizable region.

9 Claims, 12 Drawing Sheets

(56) References Cited

U.S. PATENT DOCUMENTS

| | | | | |
|---|---|---|---|---|
| 2017/0098132 | A1* | 4/2017 | Yokota | G06T 7/194 |
| 2017/0113685 | A1* | 4/2017 | Sendhoff | G08G 1/09626 |
| 2020/0026935 | A1* | 1/2020 | Hayashi | G06V 20/582 |
| 2020/0079504 | A1* | 3/2020 | Hieida | G01C 21/005 |
| 2020/0108841 | A1* | 4/2020 | Jeon | B60W 30/18036 |
| 2021/0239809 | A1* | 8/2021 | Jang | G01S 7/497 |
| 2022/0111868 | A1* | 4/2022 | Costea | B60W 60/0015 |
| 2022/0128377 | A1* | 4/2022 | Fujita | G01C 21/3415 |

FOREIGN PATENT DOCUMENTS

| | | | | | |
|---|---|---|---|---|---|
| CN | 113071414 | A | * | 7/2021 | H04N 7/181 |
| DE | 102018211607 | A1 | * | 1/2020 | B60J 3/0204 |
| JP | 2008-284914 | A | | 11/2008 | |
| JP | 2008268992 | A | * | 11/2008 | |
| JP | 2017-207340 | A | | 11/2017 | |
| JP | 2018-106239 | A | | 7/2018 | |
| JP | 2019-121307 | A | | 7/2019 | |
| JP | 2021-14994 | A | | 2/2021 | |

OTHER PUBLICATIONS

Japanese-language Written Opinion (PCT/ISA/237) issued in PCT Application No. PCT/JP2023/013190 dated Jun. 20, 2023 with English translation (7 pages).

* cited by examiner

[FIG. 1]
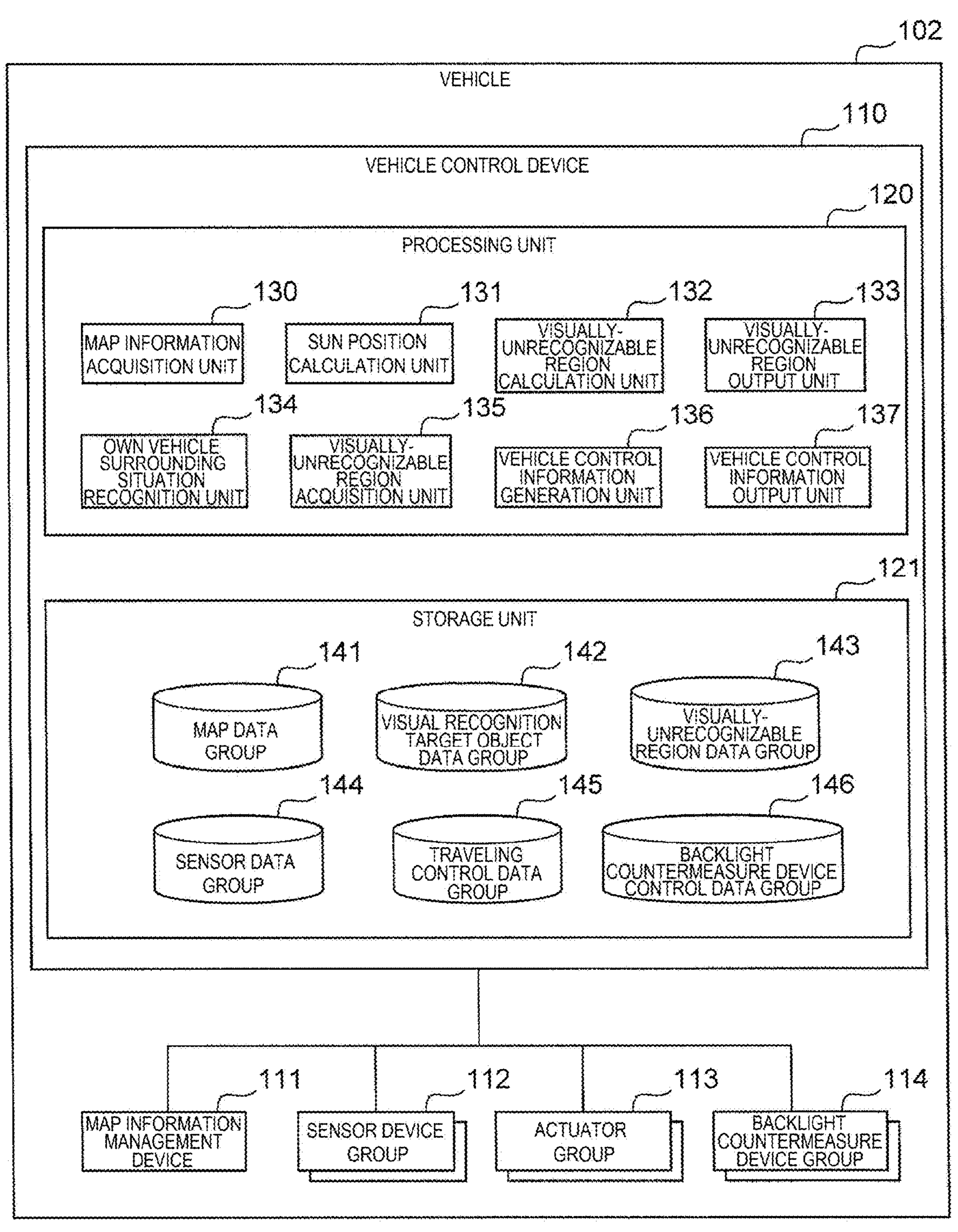

[FIG. 2]

VISUAL RECOGNITION TARGET OBJECT DATA GROUP 142

| ID (201) | TYPE (202) | POSITION (X, Y, Z) (203) | SIZE (W, L, H) (204) | DIRECTION (205) | CORRESPONDENCE ROAD ID (206) | ... |
|---|---|---|---|---|---|---|
| 1 | TRAFFIC LIGHT | (2000, 3000, 20) | (1.25, 0.5, 0.5) | 180 DEGREES | 1001 | ... |
| | | | | | | |
| | | | | | | |
| | | | | | | |
| | | | | | | |

[FIG. 3]

VISUALLY-UNRECOGNIZABLE REGION DATA GROUP 143

| ID (301) | VISUAL RECOGNITION TARGET OBJECT (302) | NUMBER OF VERTEXES (303) | VERTEX 1 COORDINATES (304) | VERTEX 2 COORDINATES (305) | VERTEX 3 COORDINATES (306) | VERTEX 4 COORDINATES (307) | ... |
|---|---|---|---|---|---|---|---|
| 1 | 1 | 4 | (1800,3020,15) | (1800,2980,15) | (1700,2980,15) | (1700,3020,15) | ... |
| | | | | | | | |
| | | | | | | | |
| | | | | | | | |
| | | | | | | | |

[FIG. 4]

[FIG. 5]
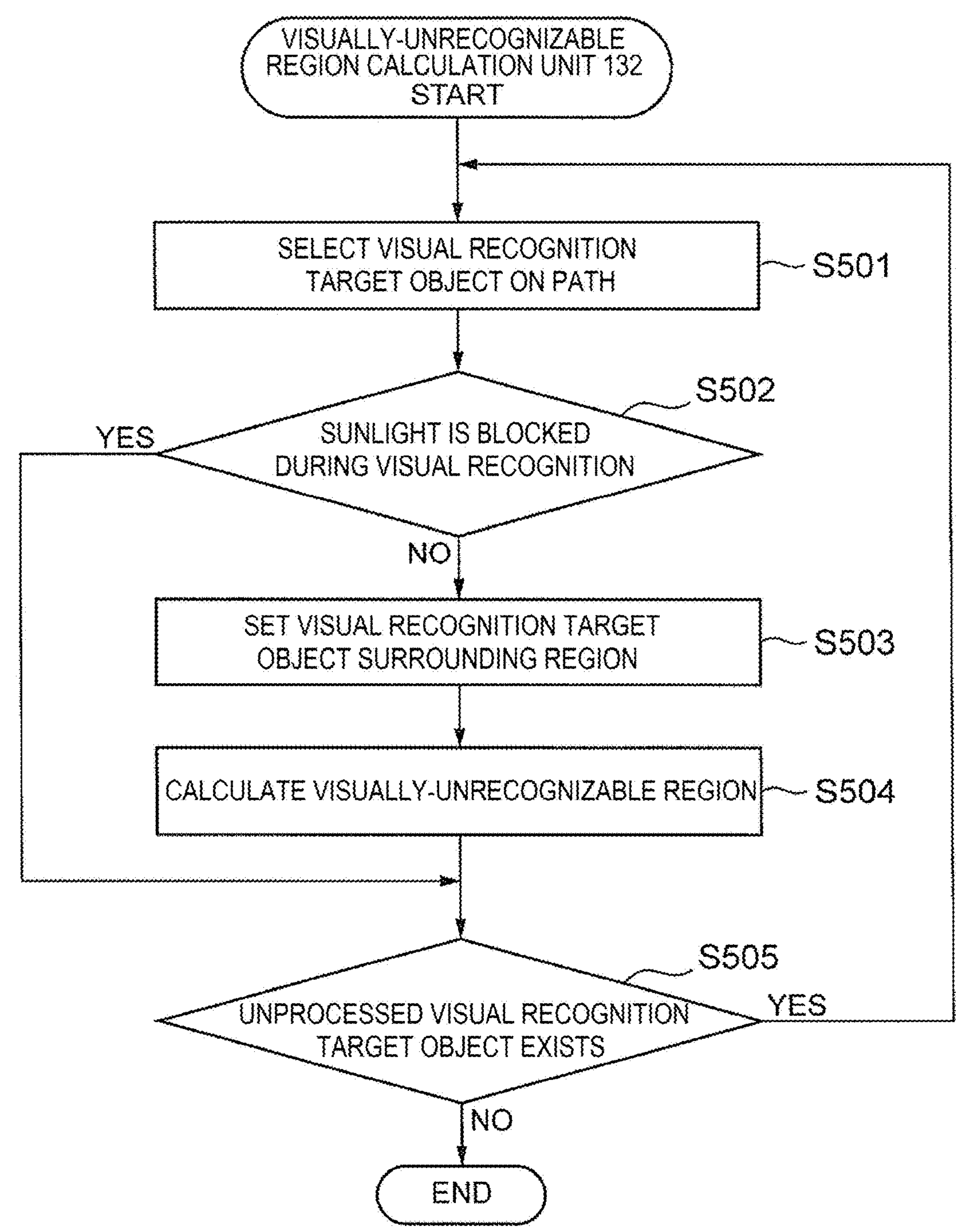

[FIG. 6]
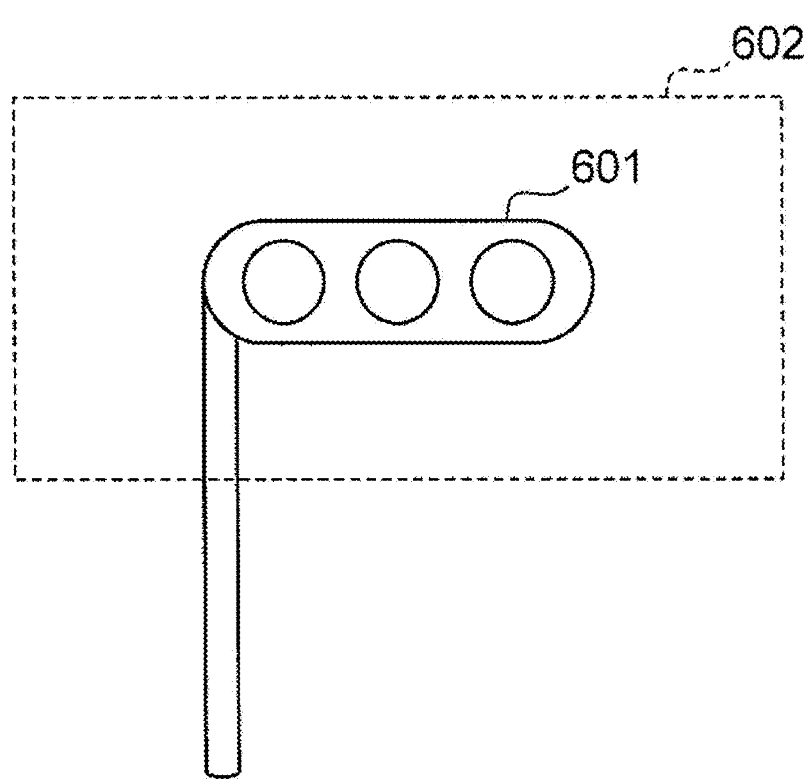

[FIG. 7]
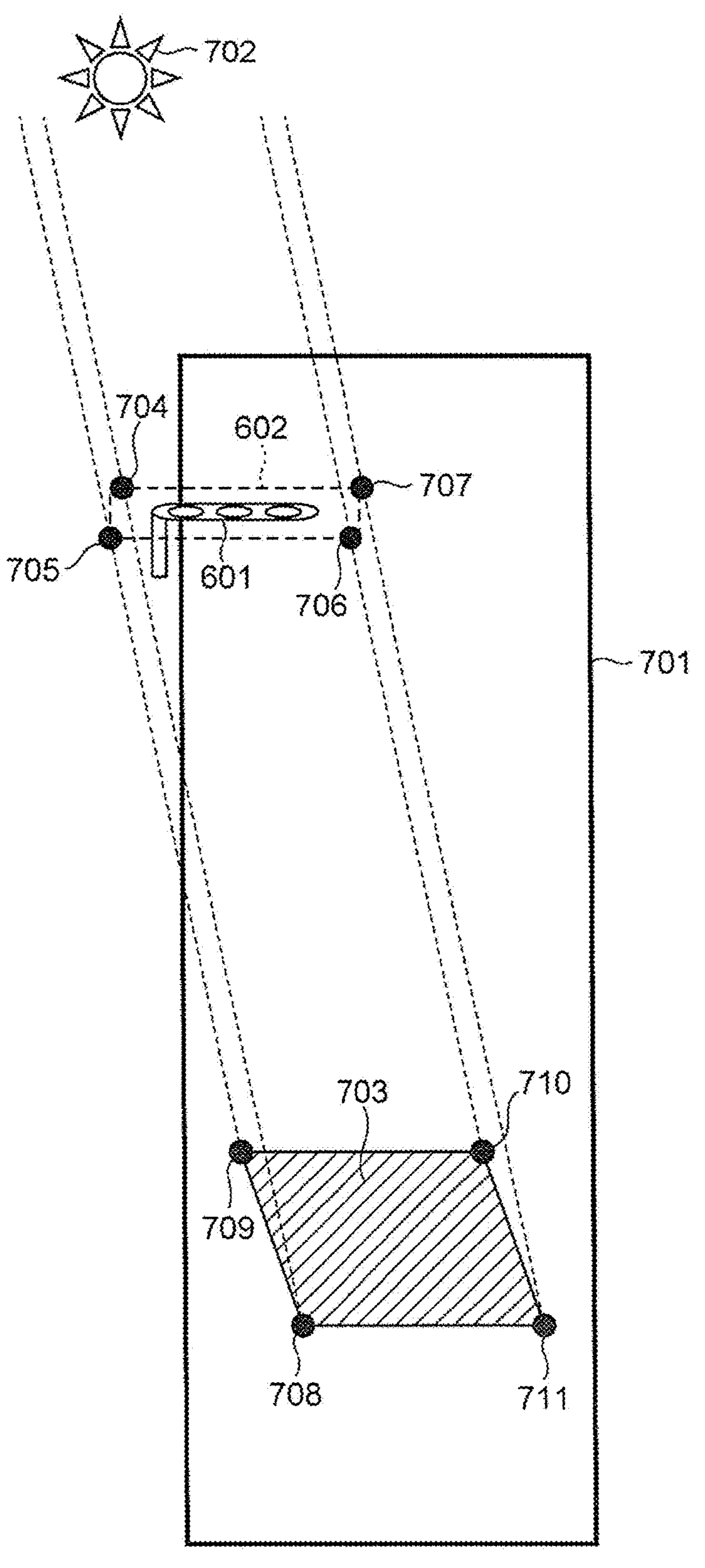

[FIG. 8]
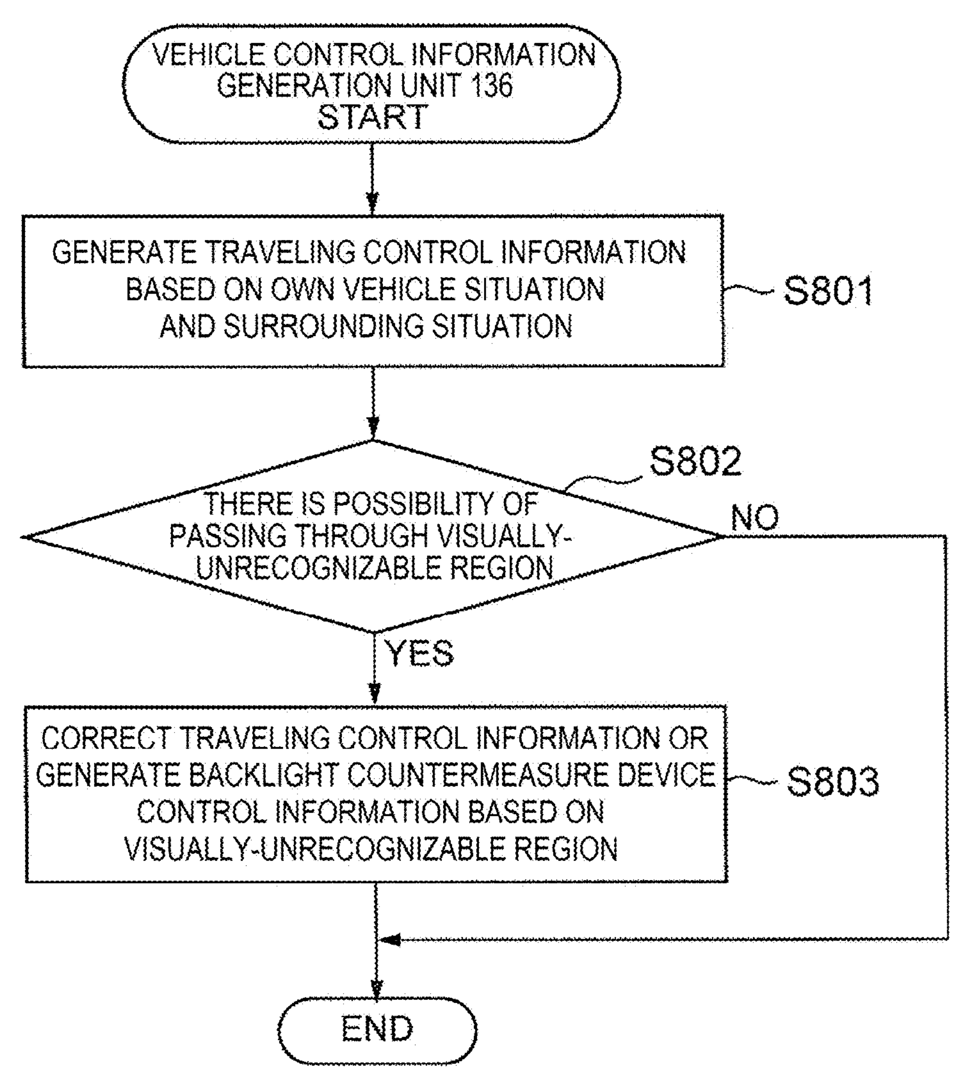

[FIG. 9]
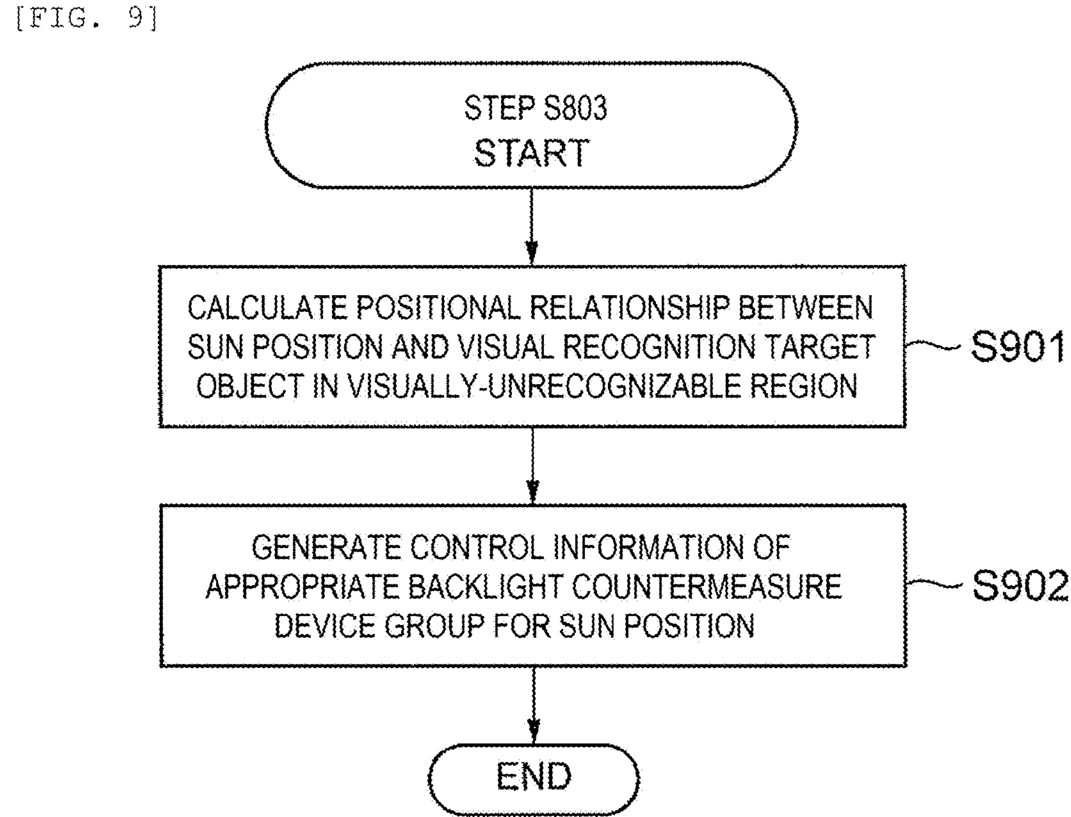

[FIG. 10]
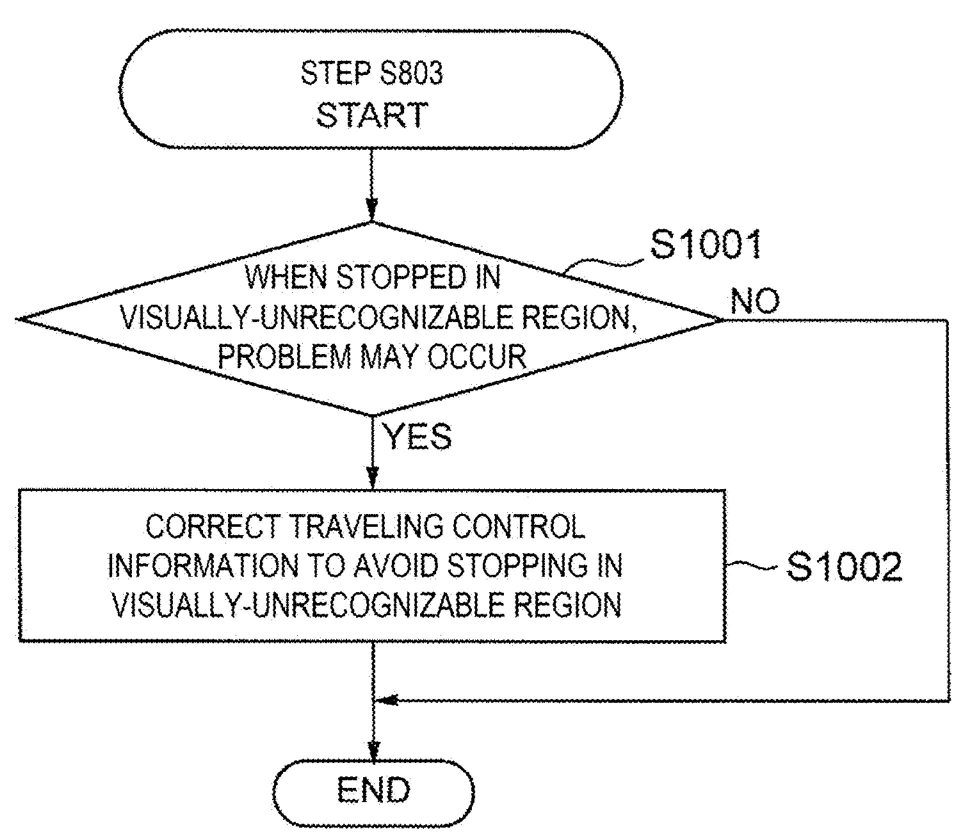

[FIG. 11]
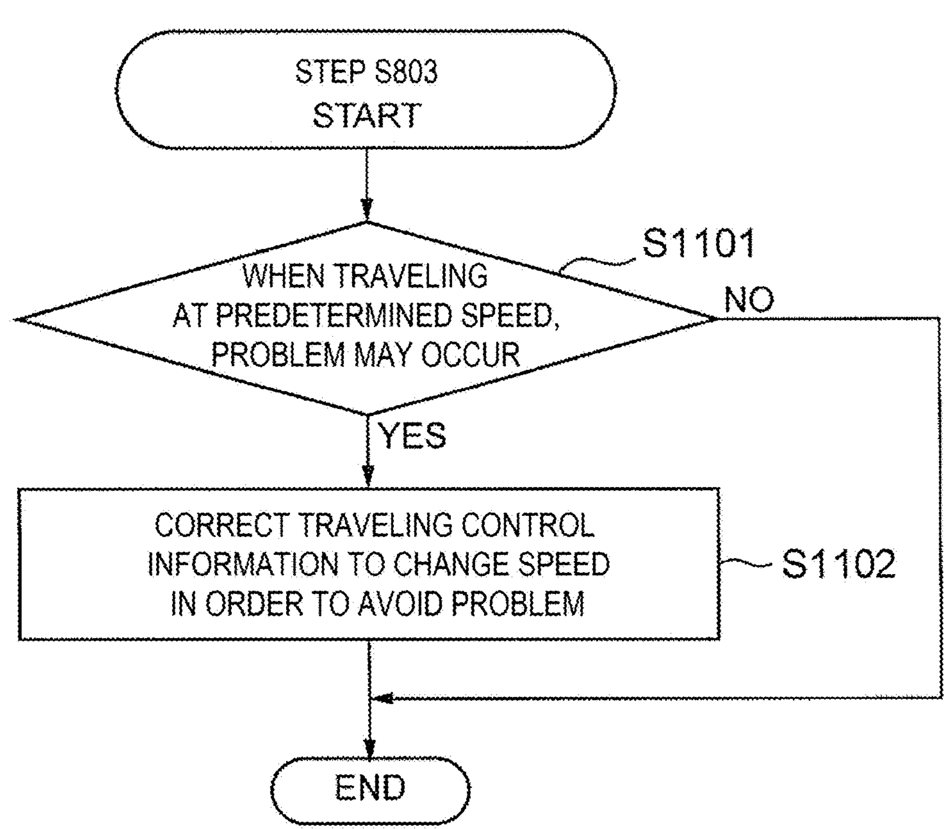

[FIG. 12]
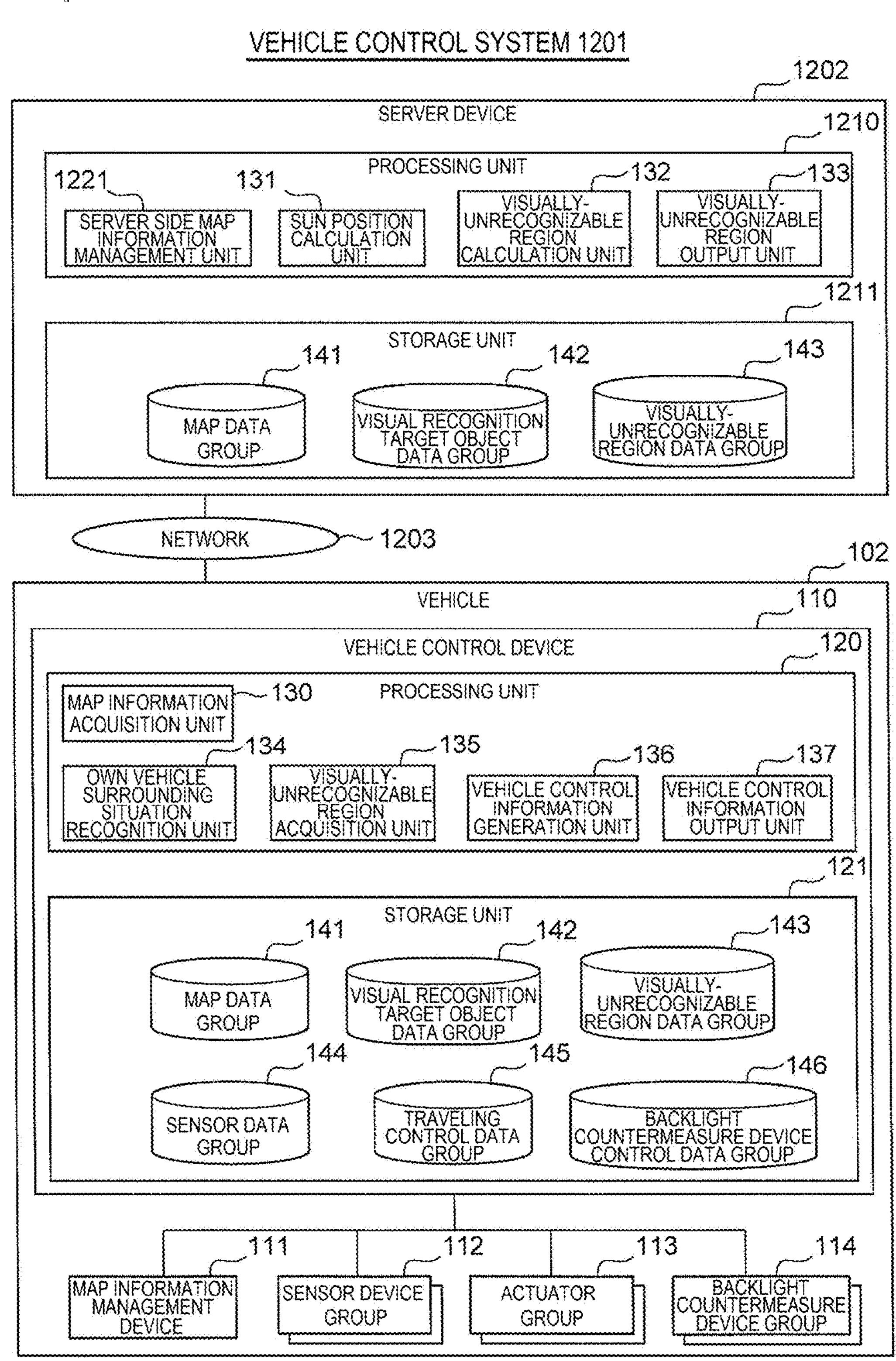

VEHICLE CONTROL DEVICE AND VEHICLE CONTROL SYSTEM

TECHNICAL FIELD

The present invention relates to a vehicle control device and a vehicle control system.

BACKGROUND ART

A vehicle control system that is mounted on a vehicle and performs driving assistance or automated driving recognizes a situation around the vehicle based on information acquired from a sensor device, and performs the driving assistance or the automated driving based on the surrounding situation.

In surrounding situation recognition using a camera device which is one of the sensor devices, there is a performance limit in which objects around the vehicle cannot be recognized because backlight causes a part of a captured image to be blown out. When the performance limit occurs when a color of a signal is recognized using the camera device, a dangerous situation such as an accident occurs. The vehicle control system is required to avoid such a dangerous situation under a backlight environment. To ensure safety, the vehicle control system is required to avoid an environment in which the performance limit occurs or to take measures to prevent problems even when the performance limit occurs.

CITATION LIST

Patent Literature

PTL 1: JP2017-207340A
PTL 2: JP2019-121307A

SUMMARY OF INVENTION

Technical Problem

PTL 1 discloses a technique of searching for a path in which an angle difference between a forward camera capturing direction and a direction in which the sun is located is maintained outside a predetermined range. The predetermined range is a range of the angle difference in which it is estimated that a surrounding situation cannot be recognized due to backlight. In PTL 1, safety is ensured by avoiding a dangerous region in which the camera capturing direction and the direction of the sun are within the predetermined range. However, according to PTL 1, the availability of the vehicle control system is greatly reduced, for example, all roads heading west in the evening will be out of range.

PTL 2 discloses a technique of setting a dangerous region in which recognition of a traffic light is difficult due to backlight and determining whether a line of sight from a camera to the traffic light is blocked by surrounding vehicles outside the dangerous region. PTL 2 refers to the dangerous region in which the traffic light cannot be recognized, but does not disclose how to set a position of the dangerous region. To ensure safety, it is desirable to sufficiently set the dangerous region more than necessary. However, setting the dangerous region larger than necessary reduces the availability of the vehicle control system. Further, a position of the sun changes every moment, and the dangerous region caused by backlight also changes every moment. PTL 2 refers to the association between the dangerous region and a time zone, but does not disclose how to set a position of the dangerous region caused by the backlight corresponding to the time zone. A region that may be dangerous during the evening time zone may be set sufficiently wide. However, the availability of the vehicle control system is reduced.

The invention has been made to solve the technical problems and takes into account an object (hereinafter, a visual recognition target object) needed to be visually recognized by a sensor device mounted on a vehicle or a driver of the vehicle (a visual recognition subject). The visual recognition target object corresponds to, for example, a traffic light.

Solution to Problem

In the invention, the vehicle control system or the vehicle control device in the vehicle control system calculates the position information of the visual recognition target object and the position of the sun in the predetermined time. Then, based on the calculated position information of the sun and the calculated position information of the visual recognition target object, a region (hereinafter, a visually-unrecognizable region) on a road in which it is difficult to visually recognize the visual recognition target object due to a backlight is calculated. Further, safety is ensured by controlling the traveling of the vehicle or a backlight countermeasure device based on the calculated visually-unrecognizable region. For example, the speed of the vehicle is adjusted such that the position of the vehicle at a timing at which the visual recognition target object needs to be visually recognized does not fall within the range of the visually-unrecognizable region as in the case of entering the intersection. For example, when it is determined that the sun is on the right side of the visual recognition target object when viewed from the visual recognition subject in the visually-unrecognizable region, the sun visor is controlled to overlap the position of the sun when viewed from the visual recognition subject.

In the invention, it may be determined whether the sunlight is blocked based on the weather information and the map information, and it may be selected not to calculate the visually-unrecognizable region. For example, when it is cloudy or rainy or when it is determined that a high-layer building is present behind the visual recognition target object, the visually-unrecognizable region is not calculated.

Advantageous Effects of Invention

According to the invention, it is possible to improve the availability of the vehicle control system while ensuring the safety thereof in a backlight environment by accurately calculating a dangerous region at the predetermined time and for the visual recognition target object, in which it is difficult to visually recognize the visual recognition target object due to the backlight. Further, the safety of the vehicle control system can be improved by taking measures based on the information on the dangerous area.

Additional features related to the invention will become apparent from the description of the present specification and the accompanying drawings. Technical problems, configurations, and effects other than those described above will be apparent according to description of the following embodiments.

BRIEF DESCRIPTION OF DRAWINGS

FIG. 1 is a functional block diagram illustrating a configuration of a vehicle control system including a vehicle control device according to a first embodiment of the invention.

FIG. 2 illustrates an example of information on a visual recognition target object data group.

FIG. 3 illustrates an example of information on a visually-unrecognizable region data group.

Figure 4:
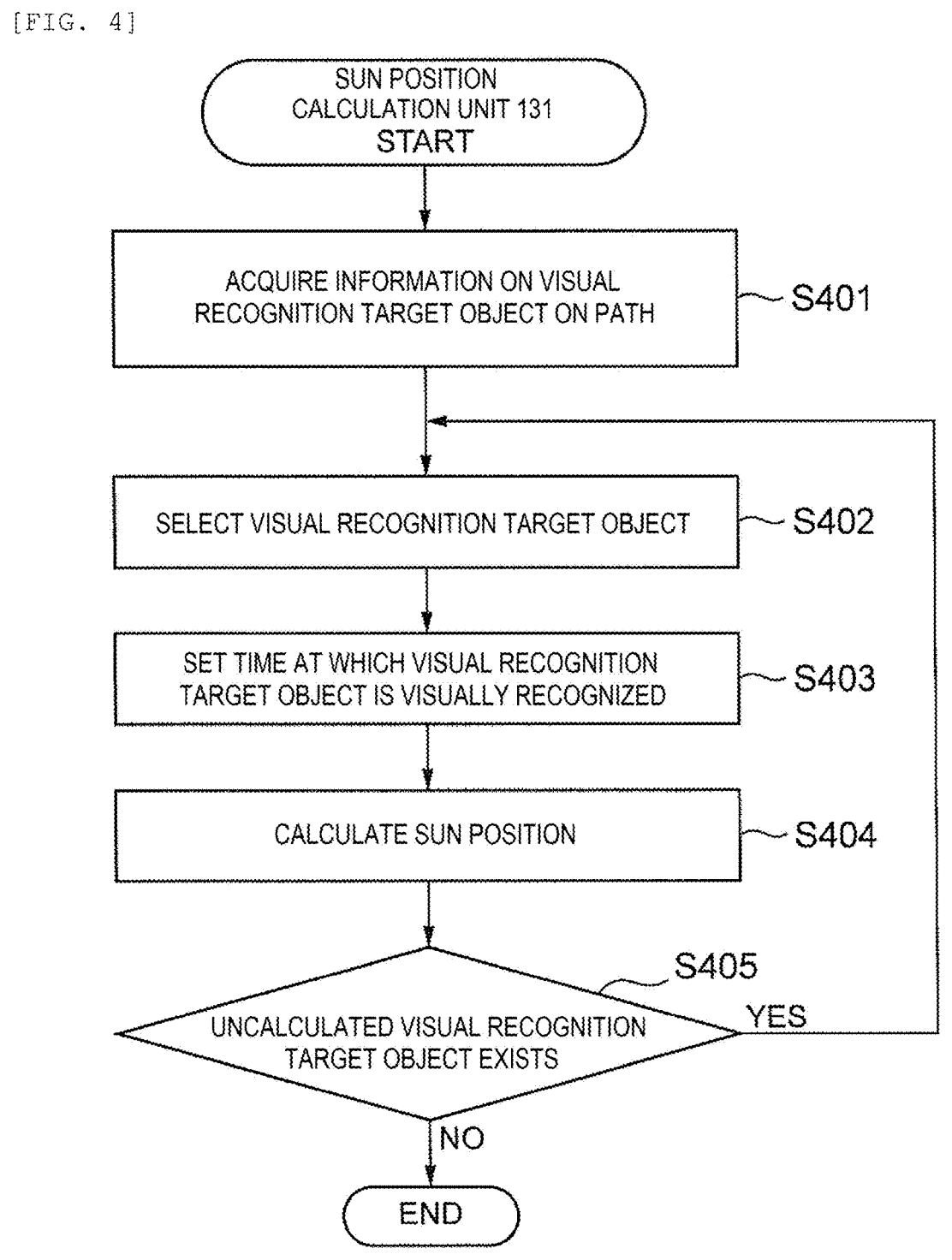

FIG. 4 illustrates a processing flow of a sun position calculation unit.

FIG. 5 illustrates a processing flow of a visually-unrecognizable region calculation unit.

FIG. 6 illustrates examples of a visual recognition target object and a visual recognition target object surrounding region.

FIG. 7 illustrates an example of a visually-unrecognizable region calculation method.

FIG. 8 illustrates a processing flow of a vehicle control information generation unit.

FIG. 9 illustrates a specific example of a part of the processing flow of the vehicle control information generation unit (relating to a backlight countermeasure device).

FIG. 10 illustrates a specific example of a part of the processing flow of the vehicle control information generation unit (relating to vehicle stop position adjustment).

FIG. 11 illustrates a specific example of a part of the processing flow of the vehicle control information generation unit (relating to vehicle speed adjustment).

FIG. 12 is functional block diagram illustrating a configuration of a vehicle control system according to a third embodiment of the invention.

DESCRIPTION OF EMBODIMENTS

Hereinafter, a first embodiment of a vehicle control device will be described with reference to FIGS. 1 to 11.

First Embodiment (System Configuration)

FIG. 1 is a functional block diagram illustrating a configuration of a vehicle control system 101 including a vehicle control device 110 according to the first embodiment of the invention. The vehicle control system 101 is mounted on a vehicle 102. The vehicle control system 101 is a system that recognizes situations such as a traveling road and a surrounding vehicle around the vehicle 102 and performs driving assistance and traveling control of the vehicle 102. The vehicle control system 101 includes the vehicle control device 110, a map information management device 111, a sensor device group 112, an actuator group 113, and a backlight countermeasure device group 114. The vehicle control device 110, the map information management device 111, the sensor device group 112, the actuator group 113, and the backlight countermeasure device group 114 are connected via an in-vehicle network.

The vehicle control device 110 is an electronic control unit (ECU). The vehicle control device 110 generates traveling control information for the driving assistance or automated driving of the vehicle 102 based on various types of input information provided by the map information management device 111, the sensor device group 112, and the like, and generates control information on the backlight countermeasure device group 114. Then, the vehicle control device 110 outputs the control information to the actuator group 113, the backlight countermeasure device group 114, and the like.

The vehicle control device 110 includes a processing unit 120 and a storage unit 121. The processing unit 120 includes, for example, a central processing unit (CPU). However, in addition to the CPU, the processing unit 120 may include a graphics processing unit (GPU), a field-programmable gate array (FPGA), or an application specific integrated circuit (ASIC) and may be implemented by any one of them. The storage unit 121 includes, for example, a storage device such as a hard disk drive (HDD), a flash memory, or a read only memory (ROM) and a memory such as a random access memory (RAM). The storage unit 121 stores programs to be processed by the processing unit 120 and a data group necessary for the processing. The storage unit 121 is also used to temporarily store data necessary for calculation of the program as a main storage when the processing unit 120 executes the program.

The map information management device 111 is a device that manages and provides digital map information around the vehicle 102, information on a traveling path of the vehicle 102, and information on a visual recognition target object. The map information management device 111 is implemented by, for example, a navigation device. The map information management device 111 includes, for example, digital road map data of a predetermined region including the vicinity of the vehicle 102, and is configured to specify a current position of the vehicle 102 on a map, that is, a road or a lane on which the vehicle 102 is traveling, based on position information of the vehicle 102 output from the sensor device group 112. The map information management device 111 further includes information on the visual recognition target object, and the visual recognition target object is associated with, for example, various types of object information (traffic lights and landmarks) in the digital road map data. The map information management device 111 outputs the specified current position of the vehicle 102, the surrounding map data, path information, and visual recognition target object information to the vehicle control device 110 via the in-vehicle network.

The sensor device group 112 is an assembly of devices that detect a situation around the vehicle 102 and various states of the vehicle 102. The sensor device group 112 corresponds to, for example, a camera device, a millimeter wave radar, a LiDAR, a sonar, or a wheel odometry. The sensor device group 112 outputs, to the vehicle control device 110 via the in-vehicle network, observation information of sensing around the vehicle 102 and information on environmental factors such as obstacles, road markings, signs, and signals specified based on the observation information. The term "obstacles" refers to, for example, other vehicles that are vehicles other than the vehicle 102, pedestrians, fallen objects on the road, or road ends. In addition, the sensor device group 112 detects the position information, a traveling speed, a steering angle, an accelerator operation amount, and a brake operation amount of the vehicle 102, and outputs the detected position information, traveling speed, steering angle, accelerator operation amount, and brake operation amount of the vehicle 102 to the vehicle control device 110 via the in-vehicle network.

The actuator group 113 is a device group that controls control elements such as steering, brakes, and accelerators that determine a movement of the vehicle. The actuator group 113 controls the movement of the vehicle based on operation information of a steering wheel, a brake pedal, and an accelerator pedal by a driver and a control command value output from the vehicle control device 110.

The backlight countermeasure device group 114 is a vehicle internal device that shields or reduces a sunlight (direct sunlight) to the visual recognition subject in the vehicle in a specified visually-unrecognizable region. Examples of the backlight countermeasure device group 114 include an electric lens hood for the sensor device group 112, an electric sun visor for the driver of the vehicle 102, and a light control glass device that changes the transmittance of the sunlight.

The processing unit 120 in the vehicle control device 110 includes, as functions thereof, a map information acquisition unit 130, a sun position calculation unit 131, a visually-unrecognizable region calculation unit 132, a visually-unrecognizable region output unit 133, an own vehicle surrounding situation recognition unit 134, a visually-unrecognizable region acquisition unit 135, a vehicle control information generation unit 136, and a vehicle control information output unit 137. The processing unit 120 implements these functions by executing a predetermined operation program stored in the storage unit 121.

The map information acquisition unit 130 acquires information from the map information management device 111 via the in-vehicle network, and stores the acquired information in a map data group 141 and a visual recognition target object data group 142 of the storage unit 121.

For each visual recognition target object on the path of the vehicle 102, the sun position calculation unit 131 calculates a position thereof and position information on the sun at a predetermined time based on the map data group 141 and the visual recognition target object data group 142. The predetermined time is, for example, a time at which the vehicle 102 is expected to pass around the visual recognition target object based on a speed of the vehicle 102 that can be acquired from the sensor data group 144 and a distance on the path to the visual recognition target object that can be acquired from the map data group 141. Alternatively, the predetermined time is a time at which the vehicle 102 is expected to pass around the visual recognition target object based on the distance on the path to the visual recognition target object and information on a road legal maximum speed on the path based on the map data group 141. Alternatively, the predetermined time is a current time. Alternatively, the predetermined time is a time after a predetermined time elapses from the current time. The predetermined time may be represented by a single time, or may be represented by time information having a width including two values of a start time and an end time. The position of the sun calculated by the sun position calculation unit 131 calculates single position information when the predetermined time is a single time, and is represented by a range in which the position of the sun can be taken in the time when the predetermined time is time information represented by the two values of the start time and the end time.

Based on the position information on the sun calculated by the sun position unit calculation 131 and position information on the visual recognition target object included in the visual recognition target object data group 142, the visually-unrecognizable region calculation unit 132 calculates the visually-unrecognizable region at the predetermined time and a predetermined position of the visual recognition target object. Then, the visually-unrecognizable region calculation unit 132 stores a result thereof in the visually-unrecognizable region data group 143.

The visually-unrecognizable region output unit 133 outputs information stored in the visually-unrecognizable region data group 143. If the output is to the same vehicle control device 110, pointer information to the visually-unrecognizable region data group 143 may be output instead of the information on the visually-unrecognizable region.

Based on the information of the map data group 141 and the sensor data group 144, the own vehicle surrounding situation recognition unit 134 recognizes a situation such as the traveling road, other vehicles, and the like around the vehicle 102. The own vehicle surrounding situation recognition unit 134 is implemented by a known technique of driving assistance and automated driving.

The visually-unrecognizable region acquisition unit 135 acquires the information on the visually-unrecognizable region from the visually-unrecognizable region output unit 133, and stores the acquired information in the visually-unrecognizable region data group 143 as necessary. When the visually-unrecognizable region output unit 133 outputs the pointer information to the visually-unrecognizable region data group 143, it is sufficient to only hold the pointer information.

The vehicle control information generation unit 136 first generates the traveling control information required for driving assistance and automated driving based on the situation around the vehicle 102 recognized by the own vehicle surrounding situation recognition unit 134, and stores the generated traveling control information in a traveling control data group 145. The generation of the traveling control information is implemented by a known technique of driving assistance and automated driving.

Then, the vehicle control information generation unit 136 updates the traveling control information included in the traveling control data group 145 based on the situation around the vehicle 102, the map data group 141, and the visually-unrecognizable region data group 143. Specifically, based on the path information included in the map data group 141 and the traveling control data group 145, it is determined whether the vehicle 102 passes through the visually-unrecognizable region. If it is determined that the vehicle passes through the visually-unrecognizable region, traveling control is considered to avoid a dangerous situation in the visually-unrecognizable region, and the traveling control data group 145 is updated. For example, when the vehicle 102 is stopped in the visually-unrecognizable region and the visual recognition target object needs to be visually recognized at that time, the traveling control data group 145 is updated such that the vehicle 102 is stopped in front of or on the other side of the visually-unrecognizable region. For example, when the vehicle 102 traveling at a predetermined speed needs to visually recognize the visual recognition target object within the visually-unrecognizable region, the traveling control data group 145 is updated such that the speed of the vehicle 102 is increased or reduced.

In addition, when it is determined that the vehicle 102 passes through the visually-unrecognizable region, the vehicle control information generation unit 136 may generate control information for controlling the backlight countermeasure device group 114 such that the visual recognition subject can visually recognize the visual recognition target object by shielding or reducing the backlight in the visually-unrecognizable region. In this case, the vehicle control information generation unit 136 stores the generated control information in a backlight countermeasure device control data group 146. For example, in a situation in which the visual recognition subject is the driver of the vehicle 102 and the sun is on the right side of the visual recognition target object when viewed from the visual recognition subject, information for controlling the electric sun visor to overlap a right side region of the visual recognition target object as viewed from the visual recognition subject is generated.

The processing of the vehicle control information generation unit 136 is not limited to the contents described above. For example, instead of updating the information of the traveling control data group 145 based on the information on the visually-unrecognizable region after generating the information on the traveling control data group 145 required for driving assistance and automated driving, the information of the traveling control data group 145 may be generated in consideration of the visually-unrecognizable region from the beginning. In addition, other processing required for safe driving assistance or automated driving may be added based on the information on the visually-unrecognizable region.

The vehicle control information output unit 137 outputs the traveling control information included in the traveling control data group 145 to the actuator group 113. The vehicle control information output unit 137 further outputs the control information included in the backlight countermeasure device control data group 146 to the backlight countermeasure device group 114. That is, the vehicle control information output unit 137 outputs information for operating the backlight countermeasure device group 114 as the control information on the vehicle.

The storage unit 121 includes the map data group 141, the visual recognition target object data group 142, the visually-unrecognizable region data group 143, the sensor data group 144, the traveling control data group 145, and the backlight countermeasure device control data group 146.

The map data group 141 is a set of data on the digital map information around the vehicle 102 and the traveling path of the vehicle 102 which are output by the map information management device 111. The map data group 141 includes road information, lane information, sign information, traffic light information, and landmark information. These pieces of information are represented using a known technique.

The visual recognition target object data group 142 is a set of data on the visual recognition target object output by the map information management device 111. The visual recognition target object data group 142 includes, for example, information on an ID, a position, a size, a direction, and a type of the visual recognition target object and a corresponding road. The type is information indicating what kind of the visual recognition target object is and corresponds to, for example, the traffic light. The corresponding road is information on a road corresponding to the visual recognition target object. For example, when the visual recognition target object is a traffic light, a traffic light in a straight-ahead direction is visually recognized at an intersection, and a traffic light in an orthogonal direction is not visually recognized. In this way, the corresponding road includes information for performing association to specify the visual recognition target object according to the road. A configuration of the visual recognition target object data group 142 is not limited to FIG. 1 and the contents described above. For example, the visual recognition target object data group 142 may be in a form of being included in the map data group 141. For example, the visual recognition target object data group 142 may be represented in a form in which flag information indicating that it is a visual recognition target object is added to the various types of object information, such as the traffic light, included in the map data group 141.

The visually-unrecognizable region data group 143 is a set of data on the visually-unrecognizable region. The visually-unrecognizable region data group 143 includes, for example, an ID of the visually-unrecognizable region, an ID of the corresponding visual recognition target object, and position information on vertexes implementing the visually-unrecognizable region. The information of the visually-unrecognizable region data group 143 is generated and stored by the visually-unrecognizable region calculation unit 132.

The sensor data group 144 is a set of data on detection information by the sensor device group 112. The detection information includes, for example, the information on the environmental factors such as obstacles, road markings, signs, and signals specified based on the observation information of sensing of the sensor device group 112, and information on the position, the traveling speed, the steering angle, the accelerator operation amount, and the brake operation amount of the vehicle 102.

The traveling control data group 145 is a set of data on plan information for controlling traveling of the vehicle 102, and includes a plan trajectory of the vehicle 102 and the control command value to be output to the actuator group 113. The information of the traveling control data group 145 is generated and stored by the vehicle control information generation unit 136.

The backlight countermeasure device control data group 146 is a set of data on control of the backlight countermeasure device group 114, and includes a control command value to be output to the backlight countermeasure device group 114. The information of the backlight countermeasure device control data group 146 is generated and stored by the vehicle control information generation unit 136.

(Data Configuration Examples)

FIG. 2 is a diagram illustrating an example of information on the visual recognition target object data group 142.

A column 201 is an ID for uniquely identifying the visual recognition target object. A column 202 is a value indicating the type of the visual recognition target object. A value indicated by the column 202 is, for example, a value corresponding to a traffic light, a sign, and an electric display plate.

A column 203, a column 204, and a column 205 are information indicating the position, the size, and the direction of the visual recognition target object. The column 203 includes, for example, information on a lateral position and a longitudinal position and height information in the map data group 141. The column 203 may be represented by the same coordinate system as a coordinate system represented by the map data group 141, or may be represented by another coordinate system having a one-to-one correspondence with the coordinate system. The column 204 includes information on a width, a depth, and a height of the visual recognition target object. The column 205 is represented by an angle with respect to a predetermined direction or a predetermined coordinate axis, which serves as a reference, in the map data group 141.

A column 206 is information for identifying a road associated with the visual recognition target object, and a road ID stored in the map data group 141 is set therein. A plurality of the columns 206 may be set on an assumption of being associated with a plurality of roads, or a lane ID may be set as a value for identifying an associated lane.

The information on the visual recognition target object is not limited to the contents of FIG. 2. For example, information on subtypes for identifying a pedestrian traffic light and a traffic light with a right turn arrow in the case of the traffic light may be included. For example, to associate the visual recognition target object with each type of object information of the map data group 141, information on an ID of each object included in the map data group 141 may be included. Further, as described above, instead of preparing a table illustrated in FIG. 2, information similar to that of FIG. 2 may be represented by adding the flag indicating that it is the visual recognition target object to the various types of object information included in the map data group 141.

FIG. 3 is a diagram illustrating an example of information on the visually-unrecognizable region data group 143. A column 301 is an ID for uniquely identifying the visually-unrecognizable region. In a column 302, any value present in the column 201 of the visual recognition target object data group 142 is set, and the visual recognition target object and the visually-unrecognizable region are associated with each other. When the flag information indicating that it is a visual recognition target object is added to the various types of object information of the map data group 141 instead of preparing the visual recognition target object data group 142 in FIG. 2, the IDs of the various types of object information are set here.

A column 303 is the number of vertexes included in each visually-unrecognizable region. Columns 304 to 307 are position information on each vertex when the number of vertexes is 4. Each of the columns 304 to 307 includes, for example, the information on the lateral position and the longitudinal position and the height information in the map data group 141. The columns 304 to 307 may be represented by the same coordinate system as the coordinate system represented by the map data group 141, or may be represented by another coordinate system having a one-to-one correspondence with the coordinate system.

The information on the visually-unrecognizable region data group 143 is not limited to the contents of FIG. 3. For example, assuming that the visually unrecognizable region is a polygon having five or more vertexes, information on five or more vertexes may be included.

(Calculation of Visually-Unrecognizable Region)

Processing of calculating the visually-unrecognizable region, which is performed by the sun position calculation unit 131 and the visually-unrecognizable region calculation unit 132, will be described with reference to FIGS. 4 to 7.

FIG. 4 is a diagram illustrating a processing flow of the sun position calculation unit 131.

The sun position calculation unit 131 refers to the map data group 141 and the visual recognition target object data group 142 to acquire all the visual recognition target objects on the path of the vehicle 102 (step S401). For example, when the path information on the vehicle 102 is given as a list of road IDs, the visual recognition target object may be acquired by searching for list information on the road IDs and the column 206 of the visual recognition target object data group 142. Even when the path information is a list of lane IDs, and the column 206 of the visual recognition target object data group 142 is the lane ID, a search can be performed in the same manner. In addition, when the path information on the vehicle 102 is given as the list of road IDs, the visual recognition target object may be acquired by acquiring position information on a road region from the list of road IDs and the map data group 141 and searching for the visual recognition target object present within a range of a predetermined distance from this position.

Then, the sun position calculation unit 131 selects one of the acquired visual recognition target objects (step S402). The subsequent steps S403 and S404 are performed on the visual recognition target object selected here (hereinafter, a selection visual recognition target object).

The sun position calculation unit 131 sets a time at which the vehicle 102 visually recognizes the selection visual recognition target object (step S403). For example, the speed of the vehicle 102 is acquired from the sensor data group 144, and based on the speed or an average speed calculated therefrom and the path information on the vehicle 102 included in the map data group 141, the time at which the vehicle 102 passes around the selection visual recognition target object is predicted and set. Alternatively, based on the path information on the vehicle 102 and the information on the road legal maximum speed on the path included in the map data group 141, the time at which the vehicle 102 passes around the selection visual recognition target object may be predicted and set. Alternatively, a current time may be set assuming that the selection visual recognition target object is present around the vehicle 102. Alternatively, a time after a predetermined time elapses from the current time may be set. The time may be represented by a single time, or may be represented by time information having a width by two pieces of information of a start time and an end time.

Next, the sun position calculation unit 131 calculates the position of the sun based on the time information and the position information of the selection visual recognition target object (step S404). A calculation method thereof is implemented by a known technique, and the calculated position of the sun is represented by, for example, an elevation angle and an azimuth. The representation of position information of the sun calculated in step S404 differs depending on the representations of the time information in step S403. When the time information is represented by a single time, the position of the sun corresponding to the time is represented as single position information. When the time information is represented as information having a width of the start time and the end time, the position of the sun is also represented as a position range of the sun that can be taken between the start time and the end time.

Then, for the visual recognition target objects acquired in step S401, the sun position calculation unit 131 confirms whether a visual recognition target object on the processing of steps S403 and S404 are not performed is present (step S405). If the visual recognition target object is present (YES in step S405), the processing returns to step S402 to select another visual recognition target object. If the visual recognition target object is not present (NO in step S405), the processing of the sun position calculation unit 131 ends.

However, steps S403 to S404 may not necessarily be performed on all the visual recognition target objects. When a plurality of the visual recognition target objects are close to one another, times set in steps S403 and S404 may be substantially the same for these visual recognition target objects, and the positions of the sun calculated based on the time may be substantially the same. Therefore, when the selection visual recognition target object is close to another visual recognition target object in which the processing of steps S403 and S404 is completed, information calculated for other visual recognition target objects may be duplicated instead of steps S403 and S404.

FIG. 5 is a diagram illustrating a processing flow of the visually-unrecognizable region calculation unit 132.

The visually-unrecognizable region calculation unit 132 selects one visual recognition target object again from the visual recognition target objects processed by the sun position calculation unit 131 (step S501). The subsequent steps S502 to S504 are performed on the visual recognition target object selected here (hereinafter, a selection visual recognition target object).

The visually-unrecognizable region calculation unit 132 determines whether the sunlight is blocked when the selection visual recognition target object is visually recognized (step S502). For example, when the map information management device 111 outputs weather information of a region included in the map data in addition to the information of the map data group 141 as dynamic information, it may be determined whether it is cloudy or rainy based on the weather information, and it may be determined that the sunlight is blocked. That is, the weather information of the region to which the selection visual recognition target object belongs at the predetermined time may be acquired, and it may be determined not to calculate the visually-unrecognizable region when it is determined that the influence of the backlight is small based on the weather information. Alternatively, based on landmark information on a high-layer building included in the map data group 141, it may be determined whether the sunlight is blocked based on a position and a magnitude of the high-layer building and a positional relationship with the selection visual recognition target object. That is, the visually-unrecognizable region calculation unit 132 may determine not to calculate the visually-unrecognizable region when it is determined that an obstacle that blocks the sunlight is present between the selection visual recognition target object and the sun based on the position information of the sun, the position information of the selection visual recognition target object, and the map information. For example, when a large landmark is present s such as a high-layer building, and the landmark is present between the selection visual recognition target object and the sun and they are close to each other, it may be determined that the sunlight is blocked. If it is determined that the sunlight is blocked (YES in step S502), the visually-unrecognizable region calculation unit 132 moves to step S505. If it is determined that the sunlight is not blocked (NO in step S502), the processing moves to step S503.

In step S503, the visually-unrecognizable region calculation unit 132 sets a visual recognition target object surrounding region for the selection visual recognition target object. The visually-unrecognizable region calculation unit 132 sets, based on the position information of the selection visual recognition target object, the visual recognition target object surrounding region including a space around the selection visual recognition target object for a spatial region occupied by the selection visual recognition target object, and calculates the visually-unrecognizable region based on the position information of the sun and the visual recognition target object surrounding region. Specifically, in consideration of the backlight, a region including the surrounding space of the selection visual recognition target object is set for the space occupied by the selection visual recognition target object. Details of the visual recognition target object surrounding region will be described below.

A case in which it is difficult for the visual recognition subject to visually recognize the selection visual recognition target object due to the backlight is a case in which the sun is present around the selection visual recognition target object when the visual recognition subject visually recognizes the selection visual recognition target object. In other words, it is a case in which a line connecting the sun and the visual recognition subject passes around the selection visual recognition target object. Therefore, when the visual recognition target object surrounding region is introduced and the line connecting the sun and the visual recognition subject passes through the visual recognition target object surrounding region, it is regarded that the visual recognition subject is difficult to visually recognize the selection visual recognition target object. A magnitude of the visual recognition target object surrounding region may be calculated by multiplying a magnitude of the selection visual recognition target object by a predetermined coefficient, or may be calculated by adding a predetermined value to the magnitude of the selection visual recognition target object. Details of the visual recognition target object surrounding region will be described later with reference to FIG. 6.

The visually-unrecognizable region calculation unit 132 calculates the visually-unrecognizable region based on the visual recognition target object surrounding region set in step S503 and the position information of the sun calculated in step S404 (step S504). An example of a calculation method thereof will be described later with reference to FIG. 7. The visually-unrecognizable region calculated here is stored in the visually-unrecognizable region data group 143.

In step S505, the visually-unrecognizable region calculation unit 132 confirms whether a visual recognition target object in which the processing of steps S502 to S504 is not performed is present. If the visual recognition target object is present (YES in step S505), the processing returns to step S501 to select another visual recognition target object. If the visual recognition target object is not present (NO in step S505), the processing of the visually-unrecognizable region calculation unit 132 ends.

FIG. 6 is a diagram illustrating a traffic light which is an example of the visual recognition target object and a corresponding visual recognition target object surrounding region. A visual recognition target object 601 is a traffic light, and information on a position and a magnitude thereof is included in the visual recognition target object data group 142. In step S503, the visually-unrecognizable region calculation unit 132 generates a visual recognition target object surrounding region 602 for the visual recognition target object 601. A magnitude of the visual recognition target object surrounding region 602 may be calculated by multiplying the magnitude of the visual recognition target object 601 by a predetermined coefficient, or may be calculated by adding a predetermined magnitude thereto. A center of the visual recognition target object 601 is configured to be the same as a center of the visual recognition target object surrounding region 602.

A space of the visual recognition target object 601 may be considered as a plane based on a surface visually recognized by the visual recognition subject as illustrated in FIG. 6, or may be considered as a three-dimensional space including the depth. FIG. 7 illustrates a case in which the plane is considered based on the visually recognized surface. The concept of considering the space as a three-dimensional space will be supplemented as necessary in the description of FIG. 7.

An example of a specific calculation method of the visually-unrecognizable region will be described using FIG. 7 taking the visual recognition target object 601 and the visual recognition target object surrounding region 602 as an example.

FIG. 7 is a top view of a road 701 on which the visual recognition target object 601 is provided. The visual recognition target object 601 and the visual recognition target object surrounding region 602 corresponding thereto are set. When viewed from a front side (a lower side in FIG. 7) of the road 701, sun 702 is present on the other side of the visual recognition target object 601. A position (an elevation angle θ1 and an azimuth θ2) of the sun 702 is calculated by the sun position calculation unit 131.

The visually-unrecognizable region calculation unit 132 calculates a visually-unrecognizable region 703 based on position information of the visual recognition target object surrounding region 602 and the sun 702. An example of a calculation method of the visually-unrecognizable region 703 will be described below.

Vertexes of the visual recognition target object surrounding region 602 are vertexes 704, 705, 706, and 707 counterclockwise from the upper left. First, a line with the elevation angle θ1 and the azimuth θ2 is drawn from the vertex 704 toward the sun. This line is a line from the vertex 704 toward the sun. Next, this line is extended in an opposite direction, a point at which this line intersects a surface of the road 701 is calculated, and this point is a vertex 708. The vertex 708 can be calculated based on position information (including height information) of any point on the road included in the map data group 141 and the position information (including the height information) and the magnitude of the visual recognition target object surrounding region 602 set in step S503. Similarly to the calculation of the vertex 708 corresponding to the vertex 704, a vertex 709 corresponding to the vertex 705, a vertex 710 corresponding to the vertex 706, and a vertex 711 corresponding to the vertex 707 are calculated. The visually-unrecognizable region 703 is given as a rectangle having these vertexes 708 to 711 as vertexes. In the example of FIG. 7, the description is made assuming that the visual recognition target object surrounding region is a rectangle, and even for other polygons, the calculation can be easily performed by similarly calculating each vertex of the visual recognition target object surrounding region and the corresponding vertex on the road 701.

Even when the road 701 is an uphill or downhill road, the visually-unrecognizable region 703 can be easily calculated. This is because the height information at each position of the road is included in the map data group 141 and taken into consideration.

When the position information of the sun 702 is represented as a position range of the sun that can be taken between the predetermined start time and end time, the visually-unrecognizable region 703 can be easily calculated by calculating the visually-unrecognizable region 703 corresponding to each position of the sun 702 within the position range and superimposing the respective visually-unrecognizable regions 703.

When the visual recognition target object surrounding region 602 includes a depth and is three-dimensional, the visually-unrecognizable region 703 can be easily calculated considering a shape when the three-dimensional visual recognition target object surrounding region 602 is projected onto the road 701 from the sun 702. For example, when an azimuth of the sun is parallel to a traveling direction of the road 701, the vertex 704 and the vertex 707 may be selected as two vertexes of an upper end of the visual recognition target object surrounding region 602 on the front side when viewed from the front side of the road 701, and the vertex 705 and the vertex 706 may be selected as two vertex of a lower end of the visual recognition target object surrounding region 602 on a rear side when viewed from the front side of the road 701. Further, if necessary, points on the road 701 corresponding to another vertex or points on edges of the visual recognition target object surrounding region 602 may be calculated, and the visually-unrecognizable region 703 may be calculated based on a result thereof.

(Calculation of Visually-Unrecognizable Region in Consideration of Height Information of Visual Recognition Subject)

FIG. 7 illustrates the calculation method of the visually-unrecognizable region 703 in a surface on the road 701. Here, a calculation method of the visually-unrecognizable region in consideration of height information of the visual recognition subject will also be described.

The height information of the visual recognition subject is a height of eyes of the driver when the visual recognition subject is the driver of the vehicle 102, and is height information set by the sensor device group 112 when the visual recognition subject is the sensor device group 112. These are represented, for example, as heights from a tire ground contact surface of the vehicle 102.

In FIG. 7, the visually-unrecognizable region 703 is calculated by calculating points at which the surface of the road 701 and the extension lines of lines drawn from the visual recognition target object surrounding region 602 toward the sun intersect. Here, instead of the surface of the road 701, a surface is considered, which is parallel to the road 701 and is present at a position obtained by adding the height information from the tire ground contact surface of the vehicle 102 to the surface of the road 701. In the description of FIG. 7, the visually-unrecognizable region is calculated by calculating the vertexes 708 to 711 that intersect with the surface of the road 701 instead of points that intersect with the surface. That is, the visually-unrecognizable region calculation unit 132 calculates the visually-unrecognizable region based on the height information of the position of the visual recognition subject in the vehicle, which visually recognizes the visual recognition target object. The visually-unrecognizable region 703 calculated by this method is a visually-unrecognizable region depending on a height visually recognized by the visual recognition subject, and is a region with higher accuracy in consideration of visual recognition by the visual recognition subject.

(Generation of Vehicle Control Information)

The processing of the vehicle control information generation unit 136 will be described with reference to FIGS. 8 to 11. FIG. 8 is a diagram illustrating the entire processing flow of the vehicle control information generation unit 136.

In step S801, the vehicle control information generation unit 136 generates the traveling control information based on the information of the map data group 141, the information of the vehicle 102 that can be acquired from the sensor device group 112, and the situation around the vehicle 102 recognized by the own vehicle surrounding situation recognition unit 134, and stores the generated traveling control information in the traveling control data group 145. The processing of step S801 is implemented by a known technique related to driving assistance and automated driving.

In step S802, the vehicle control information generation unit 136 refers to the path information included in the map data group 141, the visually-unrecognizable region data group 143, and the traveling control data group 145 to determine whether there is a possibility that the vehicle 102 passes through the visually-unrecognizable region. For example, it may be determined whether there is a visually-unrecognizable region on a planned traveling trajectory of the vehicle 102 with reference to the traveling control data group 145, or it may be determined whether there is a visually-unrecognizable region on the path of the vehicle 102 with reference to the path information. If it is determined that there is a possibility of passing through (YES in step S802), the processing moves to step S803. If it is determined that there is no possibility of passing through (NO in step S802), the processing of the vehicle control information generation unit 136 ends.

In step S803, the vehicle control information generation unit 136 corrects the traveling control information included in the traveling control data group 145 based on the visually-unrecognizable region. Alternatively, the vehicle control information generation unit 136 generates control information for controlling the backlight countermeasure device group 114 based on the visually-unrecognizable region, and stores the generated control information in the backlight countermeasure device control data group 146. An example of step S803 will be described later with reference to FIGS.

9 to 11. Then, the processing of the vehicle control information generation unit 136 ends.

Hereinafter, an example of the processing of step S803 will be described with reference to FIGS. 9 to 11.

FIG. 9 is a diagram illustrating a processing flow for controlling the backlight countermeasure device group 114 as an example of step S803. This processing is performed to allow the visual recognition subject to visually recognize the visual recognition target object even in the visually-unrecognizable region by blocking the sunlight entering the visual recognition subject of the vehicle 102 by the backlight countermeasure device group 114.

In step S901, the vehicle control information generation unit 136 calculates a positional relationship between the sun and the visual recognition target object when the visual recognition subject of the vehicle 102 performs visual recognition in the visually-unrecognizable region. For example, in the visually-unrecognizable region, a positional relationship is calculated in which the sun is present on the right side of the visual recognition target object as viewed from the visual recognition subject. Changes over time, such as when the vehicle enters the visually-unrecognizable region, the sun is initially present above the visual recognition target object as viewed from the visual recognition subject, and as the vehicle travels, the sun moves from above the visual recognition target object to below the visual recognition target object, may be calculated.

In step S902, the vehicle control information generation unit 136 generates the control information of the backlight countermeasure device group 114 according to the positional relationship calculated in step S901. For example, when the sun is present on the right side of the visual recognition target object when viewed from the visual recognition subject in the visually-unrecognizable region, information for controlling the backlight countermeasure device group 114 to be disposed in a right side region of the visual recognition target object in a visual field of the visual recognition subject is generated and is stored in the backlight countermeasure device control data group 146. Then, the processing of step S803 ends.

FIG. 10 is a diagram illustrating a processing flow relating to the traveling control of the vehicle 102 as an example of step S803. This processing is performed to avoid, by adjusting a stop position of the vehicle 102, a problem that occurs when it is difficult to visually recognize the visual recognition target object when the vehicle 102 is stopped.

When the vehicle 102 is stopped in the visually-unrecognizable region, in step S1001, the vehicle control information generation unit 136 determines whether a problem that appropriate processing on the driving assistance and the automated driving provided by the vehicle control system 101 is difficult may occur.

Here, a case in which the visual recognition target object is a traffic light will be considered as an example. Whether to consider a use case of the traffic light can be determined according to the information in the column 202 of the visual recognition target object data group. A case in which a problem may occur is, for example, a case in which a stop line corresponding to the traffic light is present in the visually-unrecognizable region. This can be easily determined using the information of the map data group 141. In this case, when the vehicle 102 is stopped in the visually-unrecognizable region, since the color of the traffic light is difficult to be visually recognized due to the backlight, it is difficult to determine when the vehicle 102 needs to be started.

On the other hand, a case in which a problem does not occur is, for example, a case in which the stop line corresponding to the traffic light and the visually-unrecognizable region are separated to some extent. This can also be easily determined based on the information of the map data group 141. In this case, since it may be determined whether the vehicle 102 needs to be started according to the situation of the surrounding vehicle on the road without depending on the color of the traffic light, it is the case in which a problem does not occur.

If it is determined that a problem may occur (YES in step S1001), the processing moves to step S1002. If it is determined that a problem does not occur (NO in step S1001), the processing of step S803 ends.

In step S1002, the vehicle control information generation unit 136 corrects the traveling control information included in the traveling control data group 145 such that the vehicle 102 is not stopped in the visually-unrecognizable region. For example, when it is determined that the vehicle needs to be stopped in the visually-unrecognizable region, the traveling control information is corrected to cause the vehicle to stop in front of the visually-unrecognizable region. Alternatively, when it is determined that the vehicle 102 can be stopped at the opposite side of the visually-unrecognizable region as viewed from the vehicle 102, the traveling control information is corrected to cause the vehicle 102 to stop at the opposite side of the visually-unrecognizable region. Alternatively, after confirming that the vehicle 102 does not need to stop in the visually-unrecognizable region and in the vicinity thereof, the traveling control information is corrected to cause the vehicle 102 to pass through the visually-unrecognizable region. Then, the vehicle control information generation unit 136 ends the processing of step S803.

FIG. 11 is a diagram illustrating a processing flow relating to the traveling control of the vehicle 102 as an example of step S803. This processing is performed to avoid, by adjusting the speed of the vehicle 102, a problem that occurs when it is difficult to visually recognize the visual recognition target object when the vehicle 102 travels at a predetermined speed.

When the vehicle 102 passes through the visually-unrecognizable region at a predetermined speed, in step S1101, the vehicle control information generation unit 136 determines whether a problem that appropriate processing on the driving assistance and the automated driving of the vehicle control system 101 is difficult may occur. The predetermined speed is a speed assumed based on the current speed of the vehicle 102 that can be acquired from the sensor device group 112, the road legal maximum speed that can be acquired from the map data group 141, and the traveling speed of the vehicle around the vehicle 102 recognized by the own vehicle surrounding situation recognition unit 134. The predetermined speed does not need to be uniquely determined, and a range of the predetermined speed may be determined by two pieces of information including a legal minimum speed and a legal maximum speed. In this case, in the following description, the same processing can be easily implemented by repeating the same processing on each value within the range.

Here, similarly to FIG. 10, a case in which the visual recognition target object is a traffic light will be considered as an example. A case in which a problem may occur is, for example, a case in which the position of the vehicle 102 at a timing to visually recognize the color of the traffic light and determine whether to enter the intersection overlaps the visually-unrecognizable region at the predetermined speed. This can be easily determined based on the predetermined speed and the distance on the path from the visually-unrecognizable region to the traffic light that can be acquired from the map data group 141 and the visually-unrecognizable region data group 143. In this case, since the color of the traffic light is difficult to be visually recognize due to the backlight, it is difficult to determine whether the vehicle 102 needs to enter the intersection.

On the other hand, a case in which a problem does not occur is, for example, a case in which the position of the vehicle 102 at a timing to visually recognize the color of the traffic light and determine whether to enter the intersection does not overlap the visually-unrecognizable region at the predetermined speed. In this case, since the color of the traffic light can be visually recognized at a necessary timing, appropriate processing can be performed.

If it is determined that a problem may occur (YES in step S1101), the processing moves to step S1102. If it is determined that a problem does not occur (NO in step S1101), the processing of step S803 ends.

In step S1102, the vehicle control information generation unit 136 corrects the traveling control information included in the traveling control data group 145, and adjusts the speed of the vehicle 102 in the visually-unrecognizable region and in the vicinity thereof. For example, the speed of the vehicle 102 is reduced such that the position of the vehicle 102 at the timing to visually recognize the color of the traffic light and determine whether to enter the intersection is on the opposite side of the visually-unrecognizable region (that is, a side closer to the traffic light than the visually-unrecognizable region). Alternatively, the speed of the vehicle 102 is increased such that the position of the vehicle 102 at that timing is on the front side of the visually-unrecognizable region (that is, a side further away from the traffic light than the visually-unrecognizable region). Then, the vehicle control information generation unit 136 ends the processing of step S803.

Each of FIGS. 9 to 11 is a diagram illustrating an example of the processing of step S803, and the processing performed in step S803 is not limited to any one of FIGS. 9 to 11. For example, a plurality of pieces of processing may be performed at the same time by integrating FIGS. 9 to 11. For example, in addition to FIG. 9 to FIG. 11, to improve the safety of the vehicle control system 101, any correction may be added to the traveling control data group 145 based on the information of the visually-unrecognizable region.

According to the description of FIGS. 1 to 11, the vehicle control device 110 calculates the visually-unrecognizable region corresponding to the visual recognition target object, and outputs information for controlling the actuator group 113 and the backlight countermeasure device group 114 based on the visually-unrecognizable region. Accordingly, it is possible to improve the availability of driving assistance and automated driving while ensuring the safety thereof in a backlight environment.

Second Embodiment (System Configuration)

A second embodiment of the invention is implemented by a part of the vehicle control device 110 according to the first embodiment. The second embodiment is the vehicle control device 110 including the map information acquisition unit 130, the sun position calculation unit 131, the visually-unrecognizable region calculation unit 132, and the visually-unrecognizable region output unit 133 in the processing unit 120, and further including the map data group 141, the visual recognition target object data group 142, and the visually-unrecognizable region data group 143 in the storage unit 121 in FIG. 1.

(Processing of Second Embodiment)

In the second embodiment, the map information acquisition unit 130, the sun position calculation unit 131, and the visually-unrecognizable region calculation unit 132 perform the same processing as those in the first embodiment. The visually-unrecognizable region output unit 133 outputs information on the visually-unrecognizable region to another vehicle control device in the vehicle 102. The another vehicle control device performs processing such as traveling control generation of the vehicle based on the visually-unrecognizable region. That is, in the second embodiment, the vehicle control device 110 plays a role of calculating the visually-unrecognizable region based on the map data group 141 and the visual recognition target object data group 142 and outputting information of the visually-unrecognizable region.

Third Embodiment (System Configuration)

A third embodiment of the invention will be described with reference to FIG. 12.

FIG. 12 is a functional block diagram illustrating a configuration of a vehicle control system 1201 according to the third embodiment of the invention. The vehicle control system 1201 includes a server device 1202, the vehicle 102, and the vehicle control device 110 mounted on the vehicle 102. The server device 1202 is a device disposed at a remote location, which is a location independent of a location of the vehicle 102, and the server device 1202 and the vehicle 102 are connected via a network 1203. The vehicle control system 1201 implements the same effects as those of the first embodiment of the invention by the server device 1202 and the vehicle control device 110 mounted on the vehicle 102.

The server device 1202 is an information processing device and includes a processing unit 1210 and a storage unit 1211. The processing unit 1210 includes a central processing unit (CPU). However, in addition to the CPU, the processing unit 1210 may include a graphics processing unit (GPU), a field-programmable gate array (FPGA), or an application specific integrated circuit (ASIC) and may be implemented by any one of them. The storage unit 1211 includes, for example, a storage device such as a hard disk drive (HDD), a flash memory, or a read only memory (ROM) and a memory such as a random access memory (RAM). The storage unit 1211 stores programs to be processed by the processing unit 1210 and a data group necessary for the processing. The storage unit 1211 is also used to temporarily store data necessary for the calculation of the program as a main storage when the processing unit 1210 executes the program.

The processing unit 1210 included in the server device 1202 includes a server side map information management unit 1221, the sun position calculation unit 131, the visually-unrecognizable region calculation unit 132, and the visually-unrecognizable region output unit 133 as functions thereof. The processing unit 1210 implements these functions by executing a predetermined operation program stored in the storage unit 1211.

The server side map information management unit 1221 manages information of the map data group 141 and the visual recognition target object data group 142 in the storage unit 1211, and outputs the information to other functions and other devices of the processing unit 1210.

The sun position calculation unit 131 and the visually-unrecognizable region calculation unit 132 are the same as those of the first embodiment of the invention. Unlike the first embodiment, the visually-unrecognizable region output unit 133 outputs the information of the visually-unrecognizable region to the vehicle control device 110 via the network 1203. The storage unit 1211 includes the map data group 141, the visual recognition target object data group 142, and the visually-unrecognizable region data group 143. These have the same role as the data groups included in the storage unit 121 of the vehicle control device 110.

As in the first embodiment, the vehicle 102 includes the vehicle control device 110, the map information management device 111, the sensor device group 112, the actuator group 113, and the backlight countermeasure device group 114. However, in the third embodiment, the map information management device 111 is not necessarily included.

Unlike the first embodiment, the processing unit 120 included in the vehicle control device 110 includes the map information acquisition unit 130, the own vehicle surrounding situation recognition unit 134, the visually-unrecognizable region acquisition unit 135, the vehicle control information generation unit 136, and the vehicle control information output unit 137.

As in the first embodiment, the map information acquisition unit 130 acquires the information on the map data group 141 and the visual recognition target object data group 142, and stores the information in the map data group 141 and the visual recognition target object data group 142 of the storage unit 121. The map information acquisition unit 130 may acquire the information from the map information management device 111 as in the first embodiment, or may acquire the information from the server side map information management unit 1221 via the network 1203.

Unlike the first embodiment, the visually-unrecognizable region acquisition unit 135 acquires information of a visually-unrecognizable region output by the visually-unrecognizable region output unit 133 via the network 1203, and stores the acquired information in the visually-unrecognizable region data group 143. The own vehicle surrounding situation recognition unit 134, the vehicle control information generation unit 136, and the vehicle control information output unit 137 are the same as those of the first embodiment of the invention.

The storage unit 121 included in the vehicle control device 110 includes the map data group 141, the visual recognition target object data group 142, the visually-unrecognizable region data group 143, the sensor data group 144, the traveling control data group 145, and the backlight countermeasure device control data group 146. These data groups are the same as those of the first embodiment.

In the third embodiment of the invention, unlike the first embodiment, the server device 1202 performs the processing of calculating the visually-unrecognizable region, and the vehicle control device 110 performs processing of generating and correcting the traveling control information of the vehicle 102 based on the visually-unrecognizable region and the processing of generating the control information of the backlight countermeasure device group 114. A feature of the third embodiment of the invention is that the server device 1202 performs the calculation of the visually-unrecognizable region. For example, without depending on the information of the vehicle 102, it is possible to distribute the information of the visually-unrecognizable region to a large number of the vehicles 102 by calculating the visually-unrecognizable region at a current time or a predetermined time after a predetermined time elapses.

Although the embodiments of the invention have been described in detail above, the invention is not limited to the embodiments described above, and various design changes can be made without departing from the spirit of the invention described in the claims. For example, the embodiments described above have been described in detail to facilitate understanding of the invention, and are not necessarily limited to those including all the configurations described above. A part of a configuration of a certain embodiment can be replaced with a configuration of another embodiment, and a configuration of another embodiment can be added to a configuration of a certain embodiment. In addition, another configuration can be added to, deleted from, or replaced with a part of a configuration of each embodiment.

REFERENCE SIGNS LIST

101: vehicle control system
102: vehicle
110: vehicle control device
111: map information management device
112: sensor device group
113: actuator group
114: backlight countermeasure device group
120: processing unit
121: storage unit
130: map information acquisition unit
131: sun position calculation unit
132: visually-unrecognizable region calculation unit
133: visually-unrecognizable region output unit
134: own vehicle surrounding situation recognition unit
135: visually-unrecognizable region acquisition unit
136: vehicle control information generation unit
137: vehicle control information output unit
141: map data group
142: visual recognition target object data group
143: visually-unrecognizable region data group
144: sensor data group
145: traveling control data group
146: backlight countermeasure device control data group
601: visual recognition target object
602: visual recognition target object surrounding region
701: road
702: sun
703: visually-unrecognizable region
1201: vehicle control system
1202: server device
1203: network
1210: processing unit
1211: storage unit
1221: server side map information management unit

The invention claimed is:

1. A vehicle control apparatus mounted on a vehicle, the vehicle control apparatus comprising:
an electronic control unit configured to
calculate position information of sun at a predetermined time;
calculate a visually-unrecognizable region in which it is difficult to visually recognize a visual recognition target object based on the position information of the sun and position information of the visual recognition target object; and
output the visually-unrecognizable region, wherein
the electronic control unit is also configured to: i) acquire information on the visually-unrecognizable region; and ii) specify the visually-unrecognizable region on a path of the vehicle based on the acquired information on the visually-unrecognizable region and output control information of the vehicle based on the specified visually-unrecognizable region, and when the vehicle stops in the specified visually-unrecognizable region, the electronic control unit is also configured to output, as the control information of the vehicle, information for stopping the vehicle in front of the visually-unrecognizable region or on an opposite side of the visually-unrecognizable region.

2. The vehicle control apparatus according to claim 1, wherein the electronic control unit is configured to calculates the visually-unrecognizable region based on height information of a position of a visual recognition subject in the vehicle that visually recognizes the visual recognition target object.

3. The vehicle control apparatus according to claim 1, wherein the electronic control unit is configured to set a visual recognition target object surrounding region including a space around the visual recognition target object for a spatial region occupied by the visual recognition target object based on the position information of the visual recognition target object, and calculates the visually-unrecognizable region based on the position information of the sun and the visual recognition target object surrounding region.

4. The vehicle control apparatus according to claim 1, wherein the electronic control unit is configured to acquire weather information of a region to which the visual recognition target object belongs at a predetermined time, and does not calculate the visually-unrecognizable region when it is determined based on the weather information that an influence caused by a backlight is small.

5. The vehicle control apparatus according to claim 1, wherein the electronic control unit does not calculate the visually-unrecognizable region when it is determined that an obstacle that blocks a sunlight is present between the visual recognition target object and the sun based on the position information of the sun, the position information of the visual recognition target object, and map information.

6. The vehicle control apparatus according to claim 1, wherein the electronic control unit is configured to calculate the position information of the sun at the predetermined time based on position information of the vehicle and time information.

7. The vehicle control apparatus according to claim 1, wherein the electronic control unit is configured to output, as the control information of the vehicle, information for operating a vehicle internal device that blocks or reduces a sunlight for a visual recognition subject in the vehicle in the specified visually-unrecognizable region.

8. The vehicle control apparatus according to claim 1, wherein when the vehicle passes through the specified visually-unrecognizable region, the electronic control unit is configured to output, as the control information of the vehicle, information for adjusting a speed of the vehicle such that a position of the vehicle at a time point at which the vehicle needs to visually recognize the visual recognition target object does not overlap the visually-unrecognizable region.

9. A vehicle control system comprising:

a server device disposed at a remote location, which is a location independent of a vehicle; and a vehicle electronic control unit configured to be mounted on the vehicle, wherein the server is configured to; i) calculate position information of sun at a predetermined time, a ii) calculate a visually-unrecognizable region in which it is difficult to visually recognize a visual recognition target object based on the position information of the sun and position information of the visual recognition target object, and a iii) output information on the visually-unrecognizable region, and the vehicle electronic control unit is configured to; i) acquire the information on the visually-unrecognizable region, and ii) specify the visually-unrecognizable region on a path of the vehicle based on the acquired information on the visually-unrecognizable region and output control information of the vehicle based on the specified visually-unrecognizable region, wherein when the vehicle stops in the specified visually-unrecognizable region, the electronic control unit is also configured to output, as the control information of the vehicle, information for stopping the vehicle in front of the visually-unrecognizable region or on an opposite side of the visually-unrecognizable region.

* * * * *